United States Patent
Wells et al.

(10) Patent No.: US 8,467,647 B2
(45) Date of Patent: Jun. 18, 2013

(54) SPLITTABLE OPTICAL FIBER RIBBONS

(75) Inventors: Ben H. Wells, Columbia, SC (US); Grant M. Davidson, Irmo, SC (US); John Sach, Columbia, SC (US)

(73) Assignee: Prysmian Communication Cables and Systems USA, LLC, Lexington, SC (US)

( * ) Notice: Subject to any disclaimer, the term of this patent is extended or adjusted under 35 U.S.C. 154(b) by 222 days.

(21) Appl. No.: 12/303,196

(22) PCT Filed: Dec. 11, 2007

(86) PCT No.: PCT/US2007/025237
§ 371 (c)(1),
(2), (4) Date: Oct. 6, 2010

(87) PCT Pub. No.: WO2009/075660
PCT Pub. Date: Jun. 18, 2009

(65) Prior Publication Data
US 2011/0058779 A1    Mar. 10, 2011

(51) Int. Cl.
*G02B 6/44* (2006.01)
*G02B 6/04* (2006.01)

(52) U.S. Cl.
USPC ..................................... 385/114; 264/1.28

(58) Field of Classification Search
USPC .............. 385/114; 206/1.24, 1.28; 264/1.24, 264/1.28
See application file for complete search history.

(56) References Cited

U.S. PATENT DOCUMENTS

| | | | |
|---|---|---|---|
| 5,717,805 A | 2/1998 | Stulpin | |
| 5,756,165 A | 5/1998 | Ali et al. | |
| 5,982,968 A | 11/1999 | Stulpin | |
| 6,175,677 B1 | 1/2001 | Yang et al. | |
| 6,195,491 B1 | 2/2001 | Jackson | |
| 6,321,014 B1 * | 11/2001 | Overton et al. | 385/114 |
| 6,337,941 B1 | 1/2002 | Yang et al. | |
| 6,748,148 B2 | 6/2004 | Chiasson et al. | |
| 6,792,184 B2 | 9/2004 | Conrad et al. | |
| 6,898,356 B2 * | 5/2005 | Sato et al. | 385/114 |

(Continued)

FOREIGN PATENT DOCUMENTS

| | | |
|---|---|---|
| CN | 1238466 A | 12/1999 |
| EP | 1 048 966 A1 | 11/2000 |

(Continued)

OTHER PUBLICATIONS

Office Action for Republic of China, dated Feb. 15, 2012 related to Chinese Application No. 200780101854.7.

(Continued)

*Primary Examiner* — Charlie Peng
(74) *Attorney, Agent, or Firm* — Finnegan, Henderson, Farabow, Garrett & Dunner, L.L.P.

(57) ABSTRACT

A splittable optical fiber ribbon has a decreased propensity for fiber fallout along a longitudinal split. Fibers adjacent to a split location, called border fibers, have increased bond strength between their ink-coating and a surrounding matrix material. The bond strength is increased by first partially curing an ink that covers the border fibers, coating the partially-cured fibers with a matrix material, and then substantially fully curing the ink and the matrix material substantially simultaneously. The ribbon may include one or more grooves to enhance splitting the ribbon into subsets.

9 Claims, 3 Drawing Sheets

U.S. PATENT DOCUMENTS

| | | |
|---|---|---|
| 7,039,282 B2 | 5/2006 | Chiasson et al. |
| 7,085,459 B2 | 8/2006 | Conrad et al. |
| 7,174,079 B2 | 2/2007 | Abel et al. |
| 7,187,830 B2 * | 3/2007 | Blazer .......................... 385/114 |
| 7,532,796 B2 * | 5/2009 | Chiasson ...................... 385/114 |
| 2004/0062501 A1 | 4/2004 | Abel |
| 2004/0086248 A1 * | 5/2004 | Wilson et al. ................. 385/128 |
| 2004/0223709 A1 | 11/2004 | Conrad |
| 2004/0247267 A1 * | 12/2004 | Imai .............................. 385/114 |
| 2005/0084224 A1 | 4/2005 | Greer et al. |
| 2007/0122094 A1 * | 5/2007 | Chien et al. ................... 385/114 |
| 2010/0296780 A1 * | 11/2010 | Schiaffo et al. ............... 385/114 |

FOREIGN PATENT DOCUMENTS

| | | |
|---|---|---|
| EP | 1048966 A1 | 11/2000 |
| EP | 1 369 723 A1 | 12/2003 |
| JP | 11-326718 | 11/1999 |
| WO | WO 2009/075660 A1 | 6/2009 |

OTHER PUBLICATIONS

Office Action for Republic of China dated Jan. 7, 2013 related to Chinese Application No. 200780101854.7.

Japanese Office Action for application No. 2010-537903.

* cited by examiner

SPLITTABLE OPTICAL FIBER RIBBONS

CROSS REFERENCE TO RELATED APPLICATIONS

This application is a National Phase application based on PCT/US2007/025237 filed on Dec. 11, 2007, the content of which is incorporated herein by reference.

TECHNICAL FIELD

The present disclosure relates generally to optical fiber ribbons, and more specifically to splittable optical fiber ribbons, methods for producing splittable optical fiber ribbons, and methods for strengthening a bond between an optical fiber and matrix material in an optical fiber ribbon.

BACKGROUND

An optical fiber ribbon is a well-known structure that includes a plurality of individual optical fibers held in spaced positions adjacent to one another, typically in a flat or planar configuration. Ribbons are generally constructed by aligning two or more optical fibers side-by-side and extruding a radiation-curable matrix material over them. The matrix material is a pliable and protective material, such as a polyurethane acrylate resin, which encases the fibers and holds them in their ribbon-like arrangement.

Unlike discrete optical fibers, which may be difficult to handle or splice, the optical fiber ribbon provides a modular design that simplifies installation and maintenance. For example, rather than having to splice hundreds of individual thread-like fibers in the field, an installer can use a fusion splicer to make connections at once involving all or subgroups of optical fibers from the ribbon. The simplicity from ribbons is magnified when they are collected in large quantities in an optical cable.

Although the ribbon may contain many fibers, smaller groups of fibers may need to be dropped off at a node. This is particularly true in optical fiber network architectures, such as a fiber-in-the-loop (FITL) architecture. Some specific applications require accessing each individual optical fiber within a given ribbon. Such applications typically are referred to as Fiber To The x (FTTx) applications, with more common ones being Fiber To The Premises (FTTP) or Fiber To The Home (FTTH). In FTTx installations, individual optical fibers need to be accessed and provided to an end-user of a given premises (e.g. an apartment or an office at a given floor of a given building).

However, current ribbon structures with a single application of matrix material do not allow for easily splitting the ribbon into smaller subgroups or units. Instead, an attempt to split the ribbon can lead to a common phenomenon called "fiber fallout," wherein the matrix material breaks and has insufficient adhesion with the fibers adjacent to where the split occurs to hold them together. These fibers adjacent to the split are often referred to as "border fibers." As a result of fiber fallout, splicing problems arise since the fiber that has "fallen out" can't be used as a ribbon or spliced as part of a ribbon.

To counteract fiber fallout, splittable ribbons can be made by pre-forming the ribbon into subunits. This process uses two or more matrix layers. One matrix material binds several groups of fibers together as one or more subunits, while a second layer of matrix material encapsulates the entire ribbon, including the subunits. The two fiber subunits may be later separated from each other by breaking the outer matrix material (i.e., the second layer of matrix material). For example, a 24-fiber ribbon can be formed by joining two 12-fiber ribbons in a first matrix layer and then binding those two subunits with an outer matrix casing. Analogously, a 12-fiber ribbon can be formed by applying a second layer of matrix material over three 4-fiber subunits bound by first matrix layers.

Such a technical solution is disclosed, for instance, in U.S. Pat. No. 6,175,677 where a primary matrix ribbonizing layer envelopes the optical fibers of a subunit and a secondary matrix ribbonizing layer envelopes the primary matrix ribbonizing layers of all the subunits forming the optical fiber ribbon.

These dual-matrix-layer solutions are attractive when the size of the subunits to be separated from the fiber ribbon is predetermined. However, a more complex manufacturing process is required to produce a dual-matrix-layer ribbon with subunits. In fact, in order to make a 12-fiber ribbon by joining three 4-fiber subunits, the manufacturing process requires four passes on the matrix coating line (one for joining each of the 4-ribbon subunits in an inner matrix material and one for joining the subunits in an outer matrix material). On the other hand, a conventional 12-fiber ribbon with a single matrix layer requires only a single pass on the coating line.

Dual-matrix-layer ribbons with subunits have other disadvantages. For example, when a fiber ribbon is formed from subunits or subgroups, each subunit's matrix layer not only sandwiches the fibers of the subunit, it also fills the space on the lateral ends of the subunit, separating axially adjacent subunits from each other. This separation between subunits introduces inconsistent distances between optical fibers in the ribbon. In particular, adjacent fibers within each subunit contact each other, while adjacent fibers between subunits are separated from each other by matrix material. As most ribbon splicers require optical fibers to be side-by-side (i.e., substantially touching each other), the inconsistent distances in dual-matrix-layer ribbons negatively affect the splicing operation. In particular, splice losses increase due to the non-uniform location of the optical fiber cores, which are not correctly lined up within the ribbon.

Another technique for making the ribbon splittable involves adding at least one stress concentration, or area of weakness, to the matrix layer immediately surrounding the fibers. These stress concentrations help isolate a split in the ribbon to a particular location and facilitate separation of the optical fiber ribbon subunits. U.S. Pat. No. 5,717,805, for example, discloses an optical fiber ribbon provided with at least one stress concentration extending along at least a portion of the ribbon parallel to the ribbon longitudinal axis. The stress concentration(s) can be formed on at least one extreme edge of the optical fiber ribbon such that the matrix material may be easily removed from a section of the optical fiber ribbon at a desired ribbon access location. Alternatively, at least one stress concentration can be formed on at least one of the major surfaces of the optical fiber ribbon at designated locations where it is desired for the optical ribbon to be separated into smaller ribbon units. When stress concentrations are formed on the major surfaces of the optical fiber ribbon, additional matrix material is provided between adjacent optical fibers at the stress concentration location such that when an optical fiber ribbon is separated at the stress concentration location, complete sub-ribbons (sub-groups) are formed (see in particular FIGS. 5, 8 and 9 of U.S. Pat. No. 5,717,805). Other art, such as U.S. Pat. Nos. 5,982,968; 6,748,148; 6,792,184; 6,337,941; 7,085,459; and 7,039,282, also discloses the formation of at least one stress concentration in the optical fiber ribbon.

Similarly, U.S. Pat. No. 7,187,830 is concerned with optical fiber ribbon units with a preferential tear portion formed between adjacent fibers in an optical fiber ribbon unit. The tear portion is formed by a weakened portion of the ribbon matrix material, the weakened portion of the matrix having a reduced cure level compared with the surrounding matrix material, thereby creating the weakened portion. The reduced cure level in the matrix material is accomplished by varying the intensity of the radiation dose to cure the matrix material at the preferential tear location.

Applicants have observed that optical fiber ribbons having a single matrix layer are particularly preferred since the above mentioned drawbacks of the dual-matrix-layer solutions are advantageously avoided and, moreover, a ribbon with a single matrix layer has a favorable reduced size with respect to a ribbon having two distinct matrix layers.

However, Applicants have also observed that with optical fiber ribbons having a single matrix layer, the border fibers in the ribbon can lose adhesion from the matrix when the ribbon is split into smaller ribbon units and the fiber fallout phenomenon can occur. Moreover, this drawback can be accentuated when stress concentrations are incorporated in the ribbon to be split. For instance, if the stress concentration is a groove and the groove is too deep, the ribbon may be mechanically unstable when handled. On the contrary, if the groove is not deep enough, the ribbon matrix may break anywhere, including at a point where there is not enough matrix material to hold the end fiber with the other fibers of the ribbon subunit which has been formed (thereby resulting in fiber fallout).

In view of these shortcomings, a need exists for providing a splittable optical fiber ribbon split that reduces the occurrence of fiber fallout. A need also exists for providing a splittable optical fiber ribbon that can be easily and correctly split into two or more ribbon subunits. Furthermore, a need also exists for more efficient manufacturing processes for making splittable optical fiber ribbons with reduced occurrence of fiber fallout.

SUMMARY

Applicants have found that in splittable optical fiber ribbons the fiber fallout phenomenon can be advantageously avoided or at least remarkably reduced by creating a strong chemical bonding between the optical fibers and the matrix material of the ribbon.

According to one embodiment of the present invention, a strong chemical bonding is created between the border fibers and the matrix material (e.g., the polymeric material of the ribbon coating). According to said embodiment the fiber fallout phenomenon is advantageously reduced for the optical fibers that are located in proximity of a splitting area of the ribbon and that, after the splitting step, are positioned at the axial ends of the obtained ribbon subunits, said optical fibers being the ones which are subject to the fiber fallout phenomenon. The strong bonding force that is obtained with the present invention allows the border fibers (obtained from splitting the ribbon) to keep axial alignment and reciprocal adjacency with the remaining adjacent optical fibers.

According to a further embodiment of the present invention, a strong chemical bonding is created between the optical fibers contained in the optical ribbon and the matrix material that coats the optical fibers so as to produce the optical ribbon.

In one aspect, a method for making a splittable optical fiber ribbon includes coating the border fibers with a first radiation-curable ink, partially curing the first radiation-curable ink, applying a matrix material over the partially-cured ink on the border fibers, and fully curing the matrix material and the partially-cured ink substantially simultaneously. Partially curing the first radiation-curable ink is performed by under-curing the ink by about 5 percent to about 15 percent. Partially curing may occur by restricting the amount of radiation reaching the first radiation-curable ink over a predetermined period of time.

The method may further include, prior to coating the plurality of optical fibers with a matrix material, covering the plurality of optical fibers other than the border fibers with a second radiation-curable ink and fully curing the second radiation-curable ink. The first and second radiation-curable inks may have different curing characteristics, where partially curing the first radiation-curable ink and fully curing the second radiation-curable ink occur by exposing the plurality of optical fibers to the same dosage of radiation. Alternatively, partially curing may include restricting the amount of radiation reaching the first radiation-curable ink over a predetermined period of time compared with the amount of radiation reaching the second radiation-curable ink.

Making the optical fiber ribbon may further include forming a groove in the matrix material extending longitudinally along and substantially between the border fibers. The minimum thickness of the matrix material within the groove is between about 0.01 millimeters and about 0.035 millimeters.

In other aspects of the disclosed embodiments, a splittable optical fiber ribbon includes a plurality of optical fibers positioned in parallel, where the plurality includes at least one group of two border fibers disposed adjacent to each other. The ribbon includes a first radiation-cured coating covering the border fibers and providing color-based identification for each of the border fibers and a second radiation-cured coating covering and providing color-based identification for each of non-border fibers. A radiation-cured matrix material encases the plurality of color-coated optical fibers and includes a longitudinal area of weakness between the at least one group of two border fibers. The matrix material is adhered to the color coating on the border fibers by chemical bonds from radiation curing.

According to embodiments of the present invention, the strong chemical bonding obtained at the interface between the coating matrix material and the border fibers is such that a considerably high strip force (i.e. higher than that of the ribbons known in the art) is required for separating the matrix material from the border fibers. Preferably, the strip force is comprised from about 0.049 N to about 4.176 N. More preferably, the strip force is comprised from about 0.080 N to about 0.500 N. Even more preferably, the strip force is comprised from about 0.098 N to about 0.348 N. The splittable optical fiber ribbon may require a force to separate the matrix material from the border fibers equivalent to the force required to separate the matrix material from the non-border fibers. Alternatively, the ribbon may require a force to separate the matrix material from the border fibers in excess of the force required to separate the matrix material from non-border fibers.

According to a preferred embodiment of the present invention, the ribbon may include a longitudinal area of weakness in the form of a groove. The angle at which the groove cuts into the horizontal plane of the matrix material is about 17° to about 35°. The groove may be positioned preferably about half way between the two optical fibers and above the optical fibers. Alternatively, the groove may be positioned between two optical fibers, but offset from the half way point thereof. In one embodiment, the longitudinally extending grooves are in the form of a v-shape.

The minimum point of matrix material between the groove and the adjacent border optical fiber may be as much as 0.035 mm of matrix material and as little as about 0.010 mm matrix material at the minimum point. The depth of the groove into the matrix material, as measured from the centerline of the optical fibers to the deepest point of the groove, is greater than about 0.090 mm in one aspect. The angle of the groove, as measured from the horizontal plane of the major surface of the matrix material, is preferably about greater than or equal to about 17.5° in one aspect, and less than about 35° in another implementation.

The groove may form a central angle in the matrix material between the adjacent optical fibers that, in one embodiment, is between about 100° and 145°. In another embodiment, the central angle will be about 135°. In another embodiment, the central angle of the groove and the depth of the groove are chosen to be such that the minimum point of the radiation curable matrix material between the wall of the groove and one of the adjacent border fibers is such that the ribbon is easily splittable, yet the split point is in the proper position to leave enough of the adjacent border fibers covered by the radiation curable matrix material to prevent fiber fallout.

Additional objects and advantages of the embodiments will be set forth in part in the description which follows, and in part will be obvious from the description, or may be learned by practice of the embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the embodiments, as claimed.

The accompanying drawings, which are incorporated in and constitute a part of this specification, illustrate several embodiments and together with the description, serve to explain the exemplary embodiments.

DESCRIPTION OF THE EMBODIMENTS

Reference will now be made in detail to the exemplary embodiments, examples of which are illustrated in the accompanying drawings. Wherever possible, the same reference numbers will be used throughout the drawings to refer to the same or like parts.

In accordance with an embodiment of the present invention, an optical fiber ribbon contains a plurality of optical fibers. As embodied in FIG. 1A, an optical fiber ribbon generally referenced as 105 has a plurality of optical fibers 121, preferably arranged side-by-side to be parallel and co-planar. Ribbon 105 includes at least two border fibers 110 among the plurality of fibers 121. The term "border fiber" refers to an optical fiber positioned at the boundary, or border, of a preferred split location in the optical fiber ribbon. Splits in the ribbon generally are desired to separate the ribbon into groups of optical fibers. Thus, as depicted in FIG. 1A, ribbon 105 is made splittable longitudinally at locations 170 and 180, for example, between or adjacent two border fibers 110.

Figure 1A:
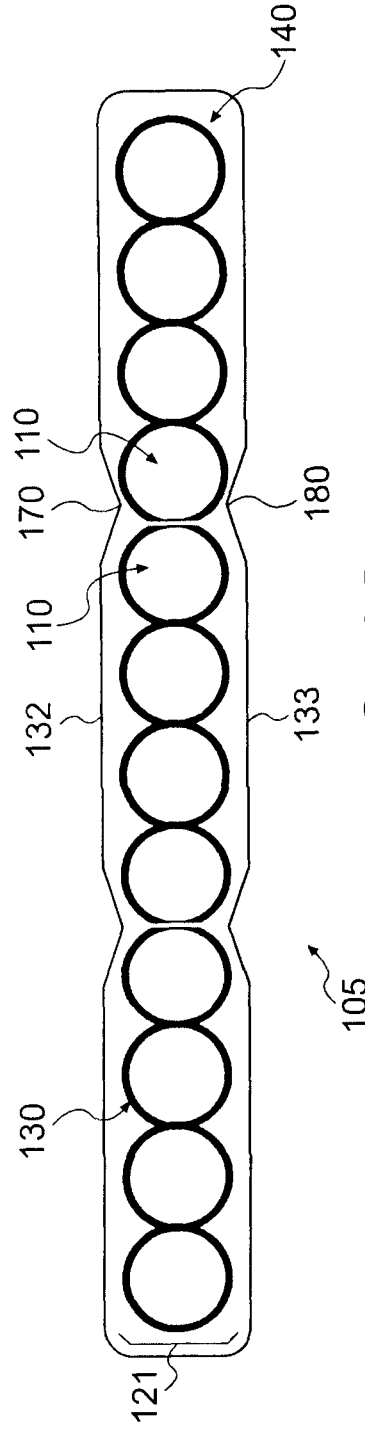
FIG. 1A is an exemplary diagram of a cross-sectional view of a splittable optical fiber ribbon, in accordance with one embodiment.
Figure 1B:
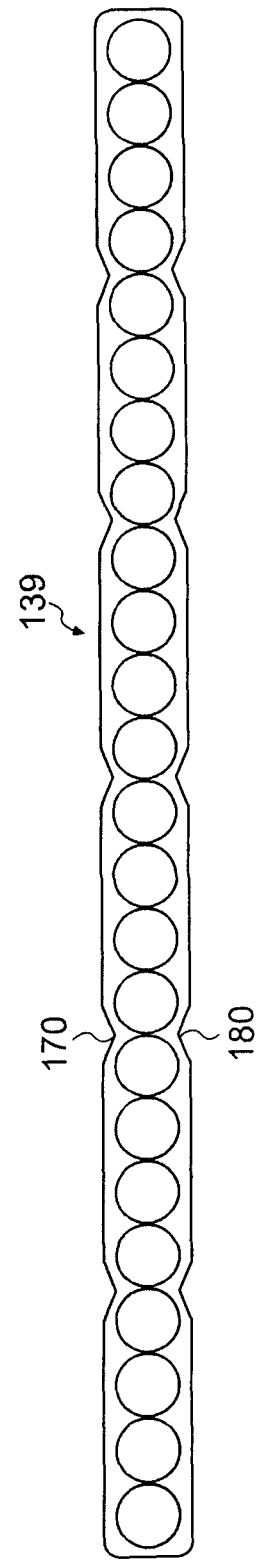
FIG. 1B is an exemplary diagram of a cross-sectional view of a splittable optical fiber ribbon, in accordance with another embodiment.

FIG. 1B depicts a cross-section of a larger version 139 of ribbon 105 of FIG. 1A. As shown in FIG. 1B, the optical fiber ribbon 139 may contain several locations 170 and 180 to split the ribbon into groups.

Figure 3:
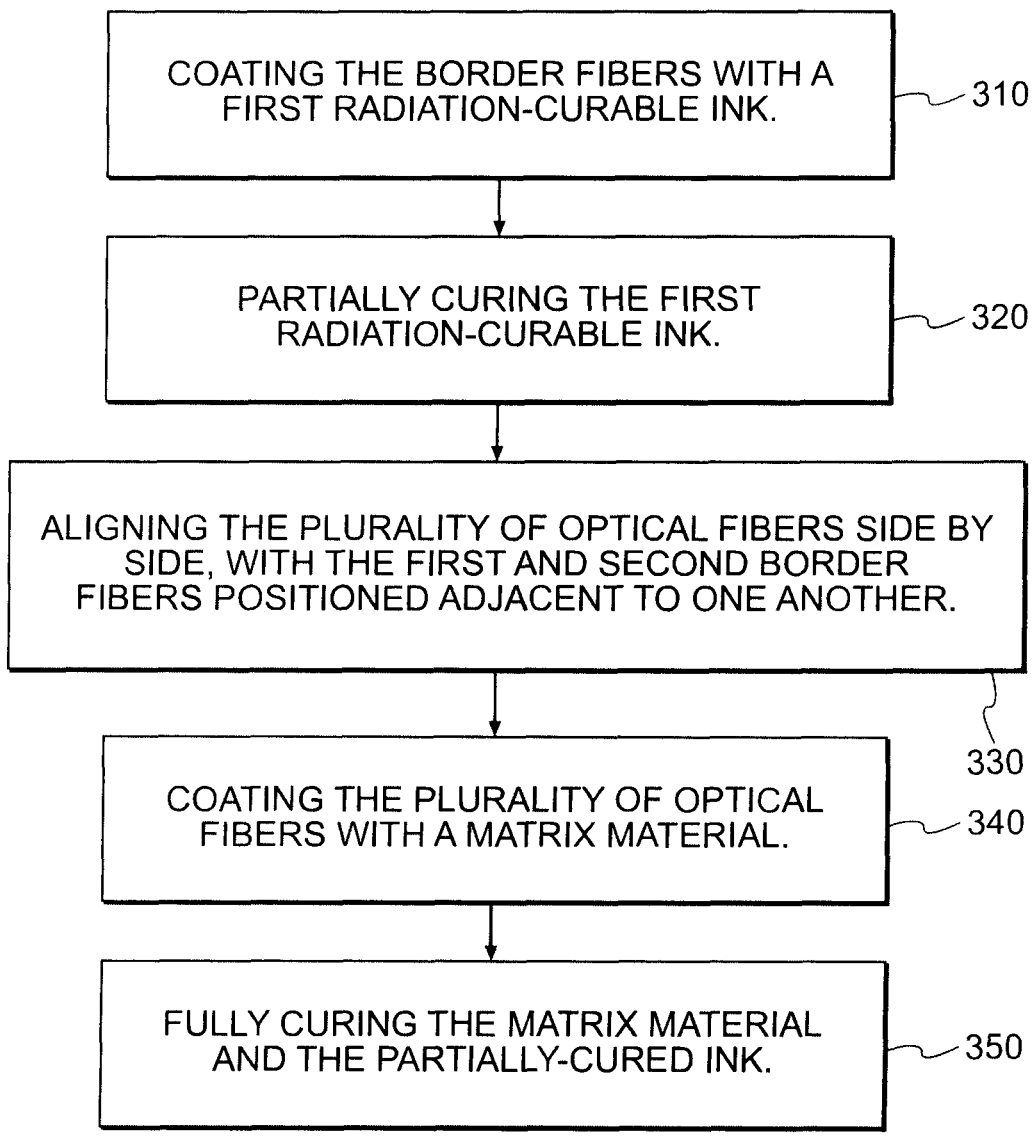
FIG. 3 is an exemplary flow chart for making a splittable optical fiber ribbon, in accordance with one embodiment.

FIG. 3 is a flow chart which shows the method steps for making an optical fiber ribbon 105 according to an embodiment of the present invention. As an initial step 310, at least one optical fiber 121 is covered (i.e., coated) with a first radiation-curable ink to make a layer thereof, said ink layer being depicted as 130 in FIG. 1A. According to one embodiment of the invention, at least border fibers 110 are provided with said first radiation-curable ink 130. Typically, the optical fiber 121 comprises a glass core which is provided with at least a primary coating (not identified in the figures) that is positioned around the glass core. Preferably, the optical fiber 121 further comprises a secondary coating (not identified in the figures) in a position radially external to the primary coating. Preferably, the first radiation-curable ink layer 130—which is several microns thick—is provided onto the optical fiber secondary coating. Alternatively, the inking process may be combined with a process for applying a secondary coating to the optical fibers. Preferably, the ink is applied by drawing the optical fibers through a coating die.

The ink, depicted as 130 in FIG. 1A, provides a distinctive pigment-based coloring to each of the optical fibers 121 in ribbon 105. Ink 130 is radiation-curable and may be any radiation-curable ink suitable for coating optical fibers, including those disclosed in U.S. Pat. No. 7,174,079, incorporated herein by reference. Preferred inks include MP series and DX-1000 series of inks from DSM Desotech. The inks used for each respective optical fiber may be multicolored. Distinctively coloring the optical fibers 121 can allow an operator to determine which fibers in the splittable optical fiber ribbon 105 carry particular data and/or should be dropped of at a particular node. In addition, fibers designated as border fibers 110 may be advantageously covered with a different ink than other fibers in order to be immediately identified by an operator.

In step 320 of FIG. 3, the radiation-curable ink on at least border fibers 110 is partially cured. Curing of ink layer 130 occurs by exposing the coated optical fiber to a sufficient dosage of radiation having wavelengths paired with the curing properties of the ink, which typically is ultraviolet light. The radiation cure level of the border fibers can be controlled in several ways. For example, undercuring may be attained by selecting an appropriate wavelength of curing light for the ink composition, by filtering radiation that would otherwise reach the coated fibers 110, or by exposing the fibers 110 to radiation for less than the time necessary for full curing. Shortening the exposure time to radiation may occur, for instance, by passing the fiber through a curing chamber at a higher than normal line speed. "Partial curing" refers to curing of the ink composition less than about 85 percent to about 95 percent of its capacity. Although ink 130 in at least border fibers 110 is partially cured in step 320, fibers coated with ink 130 in addition to border fibers 110 may also be only partially cured. Alternatively, in one embodiment, and possibly for manufacturing simplicity, all fibers 121 coated with ink 130 may be only partially cured. In this embodiment, all fibers may be considered border fibers.

Preferably, non-border fibers in ribbon 105 have their ink fully cured before assembly into a ribbon. Complete or full curing may occur, for example, by applying a sufficient dosage of radiation matched to the curing properties of the applied ink. Techniques for producing border fibers 110 with partially cured inks and other fibers with fully cured inks may include, for example, applying different light wavelengths for curing inks 130 on border versus non-border fibers, exposing border and non-border fibers to different dosages of radiation by either changing the radiation power or the speed which the fiber passes, or allowing a greater oxygen environment during the radiation cure of the border fibers (since oxygen inhibits curing). Most preferably, inks with different curing properties are applied to border versus non-border fibers so that the same radiation dosage for all the ribbon fibers (border and non-border fibers) can be advantageously applied, thereby remarkably simplifying the ribbon manufacturing process.

Step 330 in FIG. 3 indicates that the plurality of optical fibers is arranged side-by-side. As shown in FIG. 1A, the fibers are preferably positioned in a flat plane so they are just touching, with border fibers 110 positioned adjacent to one another and co-planar.

After axially aligning the optical fibers side-by-side, the plurality of fibers can be coated (i.e., covered) with a matrix material in step 340. The matrix material 140 provides a pliable, protective covering that seals the optical fibers in place and creates an outer form for ribbon 105. Matrix material 140 is radiation curable and typically translucent to UV radiation. Preferred exemplary material includes polyurethane acrylate resin. This material has been found to provide a pliable yet strong casing for retaining the optical fibers in place. Particularly preferred materials for the matrix material include DSM Desotech's products marketed under the trade names Cablelite 3287-9-85, 9D9-464, and 9D9-287.

The optical fibers are encapsulated in the matrix material 140 by applying the radiation-curable matrix material to the optical fibers as the optical fibers pass through an applicator head and a die. Step 340 preferably involves applying matrix material 140 by means of only a single pass through the applicator (also known with the term of coater). Compared with ribbons having casings of multiple matrix layers, a single pass reduces the manufacturing process complexity and costs. A single pass also avoids the bending of the fibers and possible signal attenuation that can occur in current methods that utilize multiple coating passes. Alternatively, even though less preferred, multiple coating passes and multiple matrix coatings can also be contemplated by the disclosed method and ribbon, and may be employed if desired.

Encapsulating ribbon 105 with matrix material 140 results in an optical fiber ribbon having opposing major surfaces 132 and 133, as shown in FIG. 1A. The opposing major surfaces 132 and 133 define the external major surfaces of the splittable optical fiber ribbon 105. Typically, one or both of the major surfaces 132 and 133 are substantially flat.

Finally, at step 350, the radiation-curable matrix material 140 and the radiation-curable ink 130 are substantially fully cured. Curing typically occurs by passing the matrix-coated ribbon through a chamber providing radiation of a wavelength matched with the curing properties of the matrix material, preferably ultraviolet light. Complete or full curing may occur, for instance, by applying a sufficient dosage of radiation matched to the curing properties of the applied matrix material. As referred to herein, "fully cured" includes a curing process that is greater than or equal to about 95 percent curing.

According to the method of the present invention, the under-cured inks are subjected to further curing during the curing step of the matrix material, thereby making a strong chemical bonding between the matrix material and the optical fiber ink due to at least a partial co-penetration of matrix and ink materials during curing process thereof. As mentioned above, the Applicants perceived that the fiber fallout phenomenon can be avoided—or at least remarkably reduced—by increasing the bonding force between the optical fibres in the ribbon (at least the border fibers thereof) and the matrix material, this result deriving from the strong chemical bonding which is created at the fiber/matrix material interface and being obtained by providing at least the border fibers with an under-cure ink which further cures (preferably fully cures) during the subsequent step of curing of the matrix material. This means that, even though the radiation curable ink 130 of the optical fibers is not "fully cured" at the end of the curing step of the matrix material, at the end of said step, the ink is more cured than before and thus strongly bonded to the matrix material.

Step 350 of FIG. 3 also includes "fully curing" (or, as explained above, it includes "further curing") the partially cured ink that coats at least border fibers 110. Thus, the radiation dosage and wavelength for curing matrix material 140 may be selected to provide adequate radiation for fully (or further) curing matrix 140 from its coated state and simultaneously to complete the curing of partially cured inks 130. The translucent properties of matrix material 140 enable the curing radiation to pass through material 130 and complete the curing of underlying inks 130.

Curing matrix material 140 and inks 130—the curing of said materials being carried out substantially simultaneously—creates a stronger bond between those materials than the case according to which ink 130 is fully cured before application of matrix material 140. When the final curing step 350 substantially completes the curing for inks 130 on border fibers 110, fibers 110 are more firmly bound to the matrix material in finished ribbon 105. Consequently, if splitting of ribbon 105 occurs adjacent to a border fiber 110, such as at 170 in FIG. 1A, that particular border fiber 110 has a considerably lower chance of fiber fallout compared with conventional ribbons. When fibers other than border fibers 110 are partially cured (as indicated in step 320) and then substantially fully cured with matrix material 140 (as indicated in step 350), those other fibers will also be more firmly bound through chemical bondings to matrix material 140.

With ribbon 105 obtained according to the process schematically shown in FIG. 3, the stronger bonds between at least border fibers 110 and matrix material 140 lead to lower chances of fiber fallout for those fibers adjacent a split in ribbon 105. This allows an operator to split a group of optical fibers from the rest of optical fiber ribbon 105 more easily and with greater success. For example, the force required to strip the matrix material off the adjacent optical fibers (e.g., the border fibers 110) after splitting a group from the rest of the optical fiber ribbon can range from about 0.049 N to about 4.176 N, and, in another embodiment, from about 0.080 N to about 0.500 N. More preferably, according to a further embodiment, the strip force can range from about 0.098 N to about 0.348 N.

As an example, a ribbon containing 12 optical fibers was produced according to the method of the present invention. The 12 optical fibers were colored with DSM Desotech MP-series inks, each fiber with a different color. The inks of all the optical fibers were under-cured (from about 87.5% and 92.6% curing), and the optical fiber array was coated with a matrix material and successively cured. The line-speed of the ribbon manufacturing process was of about 450 meters/minute. The curing was carried out by using two D-bulbs, one being operated at 100% of its power and the other one being operated at 45% of its power.

As a comparative example, a ribbon containing 12 optical fibers was produced. Analogously to the example mentioned above, the 12 optical fibers were colored with DSM Desotech MP-series inks, each fiber with a different color. The inks of all the optical fibers where fully cured (about 95% curing, on average) and the optical fiber array was coated with a matrix material and successively cured. The line-speed of the ribbon manufacturing process was about 450 meters/minute. The curing was carried out by using two D-bulbs and one H-bulb which were all operated at 100% of their power.

The ribbon of both the comparative example and the example of the present invention was provided with at least one longitudinal groove in one major surface of the ribbon.

In trying to obtain at least two sub-units from the starting ribbon, the Applicants noted that the ribbon of the present invention was easily and correctly split into two sub-ribbons while, on the contrary, the fiber fall-out phenomenon occurred in correspondence of the border fibers of the comparative ribbon.

As generally embodied as 170 (and 180) in FIGS. 1A and 1B, a stress concentration, or area of weakness, may be formed in one of the opposing major surfaces 132 and 133. Preferably, at least one stress concentration is provided in each of the opposing major surfaces 132 and 133. The area of weakness provides a location to ease the splitting of ribbon 105 into separate parts or subunits. In one embodiment, area of weakness 170 is a groove obtained in matrix material 140. Preferably, groove 170 is formed with a matrix die and extends longitudinally and substantially between two adjacent border optical fibers among the plurality of optical fibers 121.

As shown in FIGS. 1A and 1B, the areas of weakness may be grooves 170 and 180 on opposing sides of ribbon 105. Grooves 170 and 180 may be positioned both on opposing surfaces 132 and 133 and between the same border fibers 110, as shown in FIGS. 1A and 1B. Alternatively, grooves 170 and 180 can be positioned between multiple sets of border fibers 110 among the optical fibers 121 within the same ribbon 105.

Figure 2:
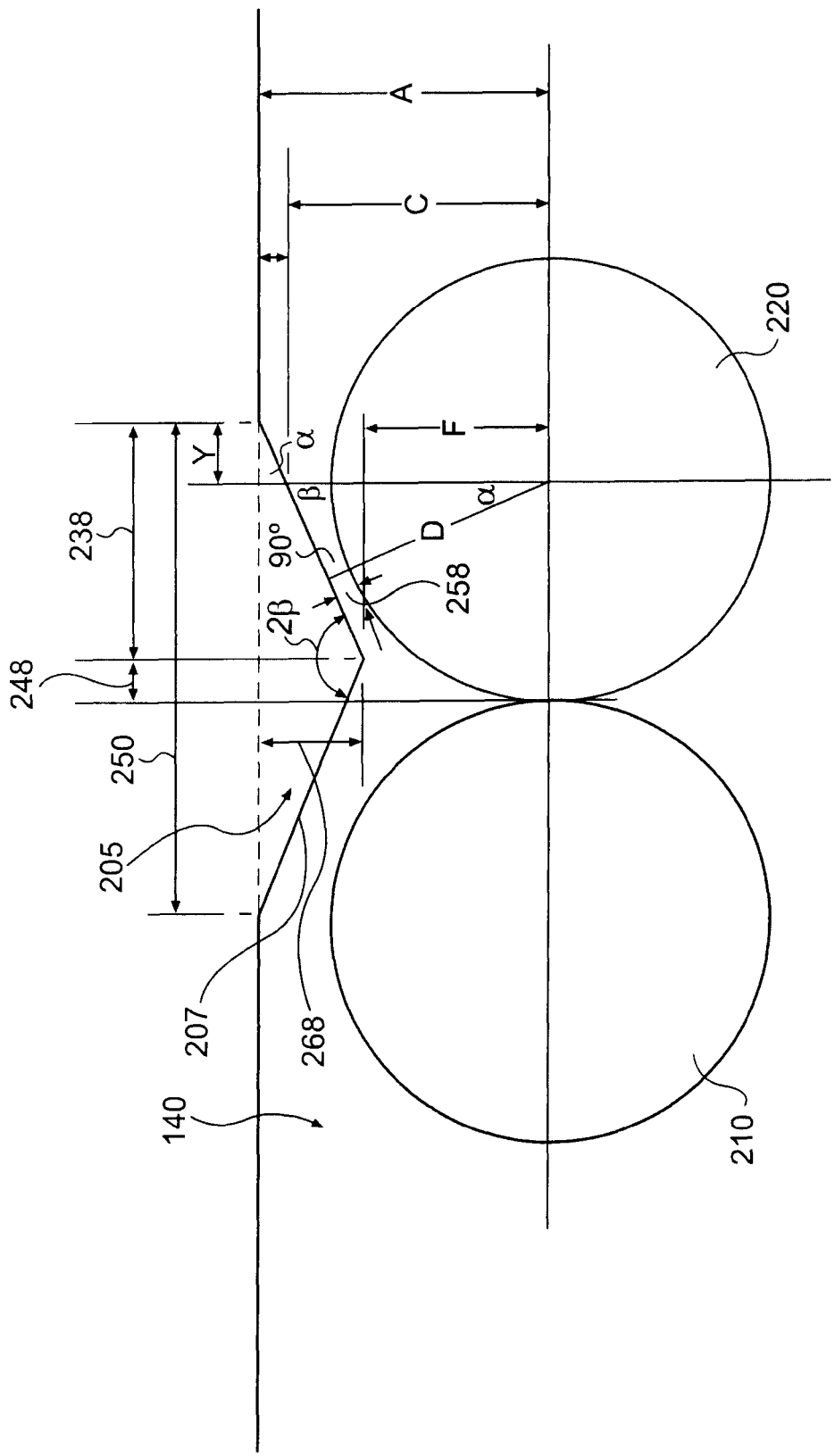
FIG. 2 is an exemplary diagram of a groove between two adjacent border fibers of an exemplary splittable optical fiber ribbon, in accordance with one embodiment.

In general, the longitudinally-formed grooves have dimensions that allow for easily splitting the ribbon, either by hand or with a tool, while leaving enough matrix material to help prevent fiber fallout. FIG. 2 depicts an exemplary groove 205 in greater detail. Although the groove 205 is v-shaped in FIG. 2, other shapes are also possible, including u-shaped grooves. In addition, the v-shape depicted includes a straight exterior 207, but the v-shape also can be formed with a curved exterior.

In addition to the method of assembling ribbon 105 in FIG. 3, grooves 170 and 180 can be dimensioned in a manner to help retain border fibers 110 within the ribbon after a split occurs. For instance, the matrix material 140 may have a minimum thickness 258 between the border fibers 210 and 220 and the walls of the groove 205, to avoid fiber fallout during splitting. Because of the increased bonding strength between the border fiber 220 and the matrix material 140 when the process of FIG. 3 is followed, the minimum thickness can be smaller than in conventional splittable optical fiber ribbons. Nevertheless, a minimum thickness 258 should still be maintained in one embodiment to help retain fiber 220 when splitting the ribbon at groove 205. In one embodiment, the minimum thickness 258 is between about 0.01 millimeters and about 0.035 millimeters. Because the groove does not necessarily follow the radius of the fiber, the minimum thickness point can be between the border fiber 220 and the wall of the groove 205, rather than at the bottom point in the groove 205. Normally, when splitting the ribbon, the break will occur at or around this minimum thickness point.

Some grooves 205 (such as the v-shaped groove in FIG. 2) may form a central angle $2\beta$ within the matrix material 140. The central angle $2\beta$ may be between about 110° to about 145°, for example. As another example, the central angle $2\beta$ is about 135°.

Groove 205 may be located substantially between adjacent optical fibers (i.e., border fibers) at a preferential splitting point. Although the groove itself may be predominantly or totally above the border fibers 210 and 220, such a groove is still "substantially between" the border fibers for the purposes of this disclosure. In addition, as referred to herein, "substantially between" includes a groove 205 that is offset from the midpoint between the centers of the adjacent optical fibers 210 and 220 by a distance 248. The allowable offset distance 248 between the midpoint between fibers 210 and 220 and the point of maximum depth of the groove may vary between embodiments, based on the central angle $2\beta$, and the combined effect of those parameters on the minimum thickness 258. For example, if the parameters result in too small of a minimum thickness 258, then the offset distance 248 (or central angle $2\beta$ should be reduced. As a general rule, a smaller central angle $2\beta$ can allow for a greater offset distance 258. In addition, these parameters affect the width 250 of the groove, which can vary in different embodiments.

The groove 205 can also vary in depth 268. The depth 268 of the groove is generally restricted by the minimum thickness 258 and the other previously-described parameters. In addition, if opposing grooves are too deep, the splittable optical fiber ribbon may lack requisite fortitude for regular handling by an operator.

The splittable optical fiber ribbon is splittable at the groove 205 by applying a slight torsion to the optical fiber ribbon unit at the fiber interval that is desired to be split off from the rest of ribbon 105. Once the localized split is made, the split is easily extended by hand for the length desired. The ribbon can be placed in the groove at the desired split point. The operator can easily press on the optical fiber ribbon in a plane perpendicular to the groove in the solid block to split the ribbon unit into sections.

When grooves are employed on opposing surfaces 132 and 133 of ribbon 105, the alignment of their respective points of maximum depth may take several embodiments. As implied by FIG. 1B, the centers of the two grooves may, for example, be co-planar and substantially perpendicular to the ribbon 105. In such an embodiment, the centers may be positioned at the midpoint between the two border fibers or may be together offset from the midpoint more closely to one of the two border fibers. Alternatively, the maximum depth for one groove 170 may be offset closer to one of the border fibers 110, while the maximum depth for another groove 180 may be positioned at the midpoint between the two border fibers 110. Alternatively, both grooves 170 and 180 may be offset from the midpoint between the two border fibers but toward different ones of the two border fibers. Other variations are also possible to help facilitate separation of the ribbon into smaller subsets.

Other embodiments will be apparent to those skilled in the art from consideration of the specification and practice of the embodiments disclosed herein. It is intended that the specification and examples be considered as exemplary only, with a true scope and spirit of the embodiments being indicated by the following claims.

What is claimed is:

1. A method for making an optical fiber ribbon containing a plurality of optical fibers being co-planar and arranged in parallel, the ribbon being splittable longitudinally along a path between at least two adjacent border fibers among the plurality, the method comprising:

coating the border fibers with a first radiation-curable ink;

partially curing the first radiation-curable ink;

covering the plurality of optical fibers other than the border fibers with a second radiation-curable ink;

substantially fully curing the second radiation-curable ink;

applying a matrix material over the partially-cured ink on the border fibers; and substantially fully curing the matrix material and the partially-cured ink substantially simultaneously.

2. The method of claim 1, wherein the partially curing is performed by under-curing the first radiation-curable ink by about 5 percent to about 15 percent.

3. The method of claim 2, wherein the partially curing comprises restricting the amount of radiation reaching the first radiation-curable ink over a predetermined period of time.

4. The method of claim 1, wherein the first and second radiation-curable inks have different curing characteristics, and wherein the step of partially curing the first radiation-curable ink and the step of substantially fully curing the second radiation-curable ink occur by exposing the plurality of optical fibers to the same dosage of radiation.

5. The method of claim 1, wherein the step of partially curing comprises restricting the amount of radiation reaching the first radiation-curable ink over a predetermined period of time compared with the amount of radiation reaching the second radiation-curable ink.

6. The method of claim 1, further comprising the step of providing at least one longitudinally extended area of weakness in the matrix material along and substantially between the border fibers.

7. The method of claim 6, wherein the at least one longitudinally extended area of weakness is provided on each opposing side of the optical fiber ribbon.

8. The method of claim 6, wherein the step of providing a longitudinally extended area of weakness is accomplished by forming a groove in the matrix material extending longitudinally along and substantially between the border fibers.

9. The method of claim 8, wherein the step of forming a groove comprises providing a minimum thickness of the matrix material of between about 0.01 millimeters and about 0.035 millimeters.

* * * * *